(12) United States Patent
Paspek et al.

(10) Patent No.: US 10,875,214 B2
(45) Date of Patent: Dec. 29, 2020

(54) FRICTION DEVICE FOR FIBER-GRANULE SEPARATION

(71) Applicant: Broadview Group International, LLC, Brook Park, OH (US)

(72) Inventors: Stephen Carl Paspek, Broadview Heights, OH (US); Joseph Edward Bork, Westlake, OH (US); Alan Fredrick Schroeder, Cleveland, OH (US)

(73) Assignee: BROADVIEW GROUP INTERNATIONAL, LLC, Brook Park, OH (US)

( * ) Notice: Subject to any disclaimer, the term of this patent is extended or adjusted under 35 U.S.C. 154(b) by 33 days.

(21) Appl. No.: 16/130,966

(22) Filed: Sep. 13, 2018

(65) Prior Publication Data

US 2019/0077052 A1   Mar. 14, 2019

Related U.S. Application Data

(60) Provisional application No. 62/557,801, filed on Sep. 13, 2017.

(51) Int. Cl.
| | |
|---|---|
| *B07B 13/00* | (2006.01) |
| *B29B 17/02* | (2006.01) |
| *B02C 23/08* | (2006.01) |
| *B02C 23/02* | (2006.01) |
| *B07B 13/16* | (2006.01) |

(Continued)

(52) U.S. Cl.
CPC .......... *B29B 17/0206* (2013.01); *B02C 23/02* (2013.01); *B02C 23/08* (2013.01); *B07B 13/003* (2013.01); *B07B 13/16* (2013.01); *B29B 17/02* (2013.01); *B29B 2017/0203* (2013.01); *B29B 2017/0224* (2013.01); *B29B 2017/0234* (2013.01); *B29L 2030/00* (2013.01); *B29L 2031/7322* (2013.01)

(58) Field of Classification Search
CPC ......... B02C 23/02; B02C 23/08; B02C 23/10; B02C 2201/04; B07B 1/00; B07B 13/003; B29B 2017/0203; B29B 2017/0224; B65G 15/10; B65G 15/14
See application file for complete search history.

(56) References Cited

U.S. PATENT DOCUMENTS

| | | | | |
|---|---|---|---|---|
| 2,462,645 | A * | 2/1949 | Knowland | B29B 17/02 241/24.17 |
| 2,529,620 | A * | 11/1950 | Marnach | A23N 5/00 460/114 |

(Continued)

FOREIGN PATENT DOCUMENTS

| | | | | |
|---|---|---|---|---|
| DE | | 10107541 C1 * | 9/2002 | B26F 3/004 |

*Primary Examiner* — Joseph C Rodriguez
(74) *Attorney, Agent, or Firm* — Wentsler LLC

(57) ABSTRACT

Methods and apparatus for treating a mixture of fiber and granules are provided. The method includes passing the mixture through a friction zone comprising a conveyor belt that moves mixture and a friction device comprising a stationary surface in contact with a surface of the mixture. The method includes applying pressure to the mixture with the friction device to generate friction such that at least 5% of the fiber in the mixture is rotated. The method includes forming an agglomerate that is larger than the granules in the mixture.

9 Claims, 3 Drawing Sheets

(51) Int. Cl.
*B29L 31/00* (2006.01)
*B29L 30/00* (2006.01)

(56) References Cited

U.S. PATENT DOCUMENTS

| | | | | |
|---|---|---|---|---|
| 2,762,506 A * | 9/1956 | Fine | ............ | B07B 9/02 |
| | | | | 209/27 |
| 4,279,338 A * | 7/1981 | Sekora | ............ | B65G 47/19 |
| | | | | 198/445 |
| 4,431,530 A * | 2/1984 | Syben | ............ | B03B 9/061 |
| | | | | 209/138 |
| 4,608,156 A * | 8/1986 | Reddish, Jr. | ............ | B07B 1/526 |
| | | | | 209/353 |
| 4,678,076 A * | 7/1987 | Nenakhov | ............ | B65G 47/19 |
| | | | | 198/525 |
| 5,094,378 A * | 3/1992 | Aso | ............ | B23H 7/10 |
| | | | | 198/626.4 |
| 5,251,827 A * | 10/1993 | Sims | ............ | B07B 1/24 |
| | | | | 241/24.21 |
| 5,513,807 A * | 5/1996 | Stricker | ............ | B03B 9/061 |
| | | | | 241/152.2 |
| 5,918,787 A * | 7/1999 | Hecky | ............ | B65H 20/06 |
| | | | | 226/172 |
| 5,947,395 A * | 9/1999 | Peterson | ............ | B02C 18/225 |
| | | | | 241/223 |
| 6,536,690 B1 * | 3/2003 | Anthony | ............ | B07B 1/12 |
| | | | | 241/24.17 |
| 6,557,696 B1 * | 5/2003 | Frich | ............ | B65G 15/14 |
| | | | | 198/626.4 |
| 6,655,167 B2 * | 12/2003 | Kantonen | ............ | B02C 19/186 |
| | | | | 241/23 |
| 7,225,932 B2 * | 6/2007 | Gencer | ............ | E01C 19/05 |
| | | | | 209/240 |
| 7,635,099 B1 * | 12/2009 | Meredith | ............ | B03B 9/061 |
| | | | | 241/21 |
| 7,938,252 B2 * | 5/2011 | Schroader | ............ | B65G 21/209 |
| | | | | 198/535 |
| 9,089,876 B2 * | 7/2015 | Hoppe | ............ | A22C 17/04 |
| 9,656,411 B2 * | 5/2017 | Hayashi | ............ | B09B 5/00 |
| 9,861,988 B2 * | 1/2018 | Rees | ............ | B02C 18/0084 |

* cited by examiner

FRICTION DEVICE FOR FIBER-GRANULE SEPARATION

CROSS-REFERENCE TO RELATED APPLICATIONS

This application claims the benefit of priority of U.S. Provisional Patent Application No. 62/557,801, titled "FRICTION DEVICE FOR FIBER-GRANULE SEPARATION," filed on Sep. 13, 2017, the entire disclosure of which is hereby incorporated by reference.

FIELD

The present disclosure relates generally to a device for fiber-granule separation, and, more particular, to a friction device for fiber-granule separation.

BACKGROUND

The recycling of materials like carpet or tires produces streams that comprise small granules and fibers. In the case of carpet recycling, the fibers come from the face fiber of the carpet, and the granules are derived from the adhesive that comprises styrene butadiene rubber (SBR) and calcium carbonate. In the case of tire recycling, the granules comprise tire rubber, and the fibers are the rayon or other polymeric fibers that comprise the tire cord. Mixed fibers and granules are also encountered in the processing of natural fiber or in the processing of foodstuffs such as meat meals wherein the fibrous component comprises animal hair.

For the purpose of discussion, granules have a ratio of the largest dimension to the smallest dimension less than 5 to 1, whereas fibers have a ratio of the largest dimension to the smallest dimension of at least 10 to 1. Typically fibers and granules are of different chemical composition. To increase the utility of these mixed streams it is desirable to separate granules from fibers.

A common method of separation is to use a screening structure where the granules fall through the mesh, and the fibers remain above the mesh. This could work if one could induce the fibers to remain parallel to the plane of the screen mesh. Unfortunately, the mechanical screening action that moves the fibers from the screener inlet to the screener outlet tends to also tip the fiber slightly out of plane. For many of the fibers, as they move across the mesh, the leading end will snag on the mesh and the fiber will dive through the screener hole. This contaminates the granules with unwanted fiber.

Another method is to use a current of moving air, such as in an aspirator or elutriator to attempt to float the fiber away from the granules. In general, fibers would tend to have more air resistance than granules, and so would preferentially lift, while granules would tend to preferentially sink. However, as fibers and granules become smaller and smaller, both begin to behave the same in an air current, and a clean separation becomes difficult. At high air velocities, too many of the smaller granules are carried over with the fiber into the light product stream, and at low air velocities, too many of the longer fibers are carried under into the heavy product stream with the granules.

SUMMARY

The following presents a simplified summary of the disclosure to provide a basic understanding of some embodiments described in the detailed description.

In accordance with some embodiments, a method for treating a mixture of fiber and granules is provided. The method comprises passing the mixture through a friction zone comprising a conveyor belt that moves mixture and a friction device comprising a stationary surface in contact with a surface of the mixture. The method comprises applying pressure to the mixture with the friction device to generate friction such that at least 5% of the fiber in the mixture is rotated. The method comprises forming an agglomerate that is larger than the granules in the mixture.

In accordance with some embodiments, a separation device for treating a mixture of fiber and granules is provided. The separation device comprises a conveyor belt configured to move the mixture. The separation device comprises a friction device positioned to contact a surface of the mixture, the friction device configured to apply pressure to the mixture to generate friction such that at least 5% of the fiber in the mixture is rotated to form an agglomerate that is larger than the granules in the mixture.

In accordance with some embodiments, a separation device for treating a mixture of fiber and granules is provided. The separation device comprises a conveyor belt configured to move the mixture. The separation device comprises a friction device positioned to contact a surface of the mixture. The friction device is configured to apply pressure to the mixture to rotate the fiber to form an agglomerate that is larger than the granules in the mixture. The separation device comprises a screen, downstream from the conveyor belt, positioned to receive the agglomerate and the granules from the conveyor belt, the screen configured to separate the agglomerate and the granules.

BRIEF DESCRIPTION OF THE DRAWINGS

These and other features, embodiments and advantages are better understood when the following detailed description is read with reference to the accompanying drawings, in which.

DETAILED DESCRIPTION

Figure 1:
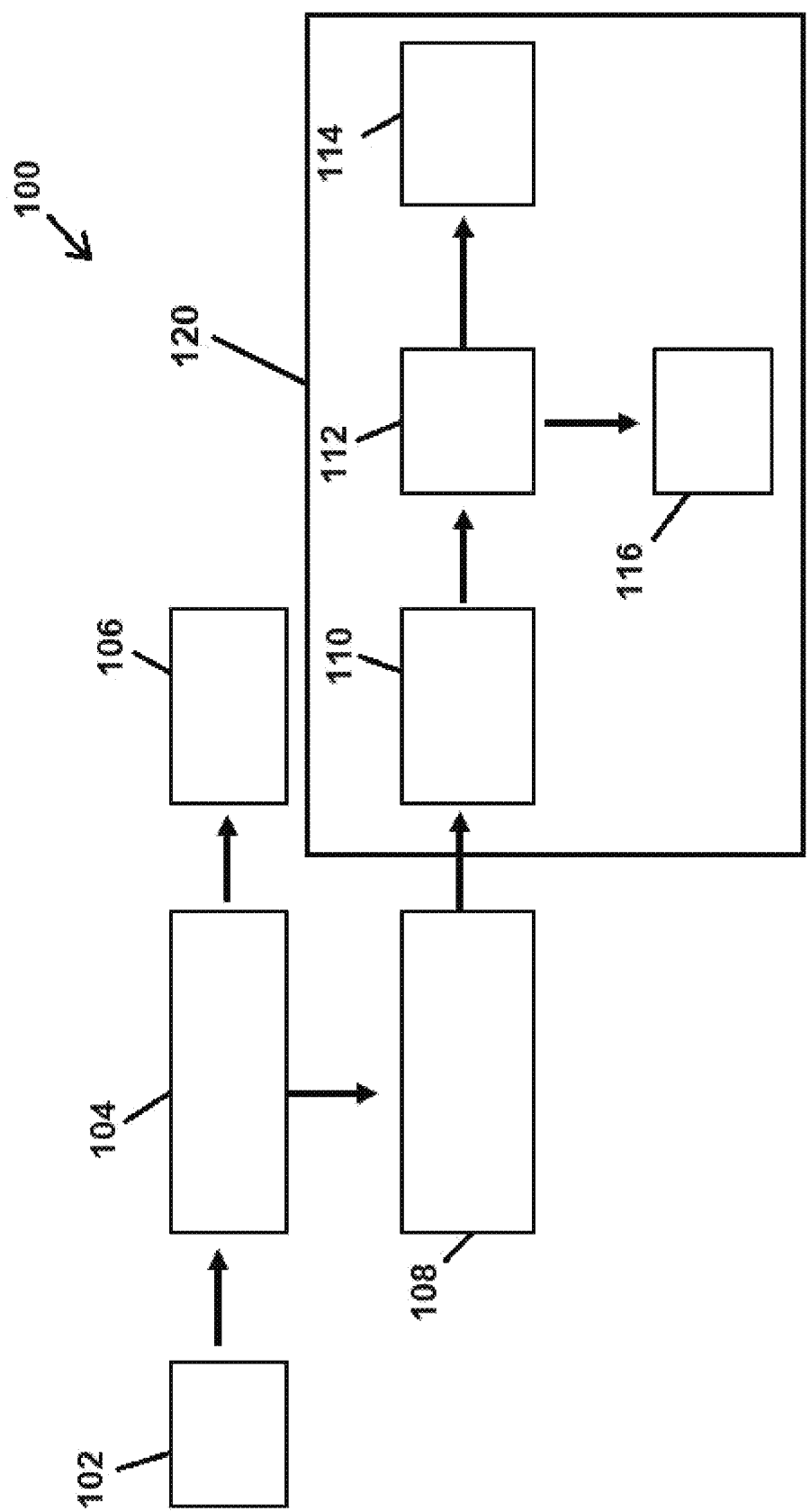
FIG. 1 schematically illustrates a fiber separator in accordance with embodiments of the disclosure.

Embodiments will now be described more fully hereinafter with reference to the accompanying drawings in which embodiments are shown. Whenever possible, the same reference numerals are used throughout the drawings to refer to the same or like parts. However, this disclosure may be embodied in many different forms and should not be construed as limited to the embodiments set forth herein.

This application capitalizes on the propensity of fibers to associate with one another and to agglomerate into larger agglomerates under the right circumstances. The agglomerates may be held together largely by entanglement. Since fibers have a long dimension, they can successfully entangle much more readily than granules that are round or ovoid.

Referring to FIG. 1, an example fiber separator 100 is illustrated. In some embodiments, the fiber separator 100 can be used to separate one or more products from a mixture. For example, the fiber separator 100 can be used to separate a fiber from a granule. In some embodiments, a product 102 can be supplied to the fiber separator 100. The product 102 may comprise, for example, a carpet (e.g., a recycled carpet), a tire, other products that may contain fibers, granules, adhesives, etc. In some embodiments, the product 102 may be obtained from one or more of an industrial stream containing fiber, a post-consumer stream containing fiber, a food product containing fiber, a material containing hair, etc.

In some embodiments, the product 102 may initially be separated into one or more sub-products. For example, the product 102 can initially be separated by a separator 104 into a low ash fiber 106 and a mixture 108, such as a fiber and granule mixture. The product 102 can be separated in several ways into the low ash fiber 106 and the mixture 108, such as by manually or with a device. In some embodiments, the separator 104 comprises a screen with one or more openings through which the low ash fiber 106 can be separated from the granule and fiber mixture 108. In some embodiments, portions of the low ash fiber 106 may inadvertently be mixed with the mixture 108, such that the mixture 108 can contain granules and fiber. This inadvertent mixing may be a result of portions of the low ash fiber 106 being insufficiently separated, such as by falling through the openings in the separator 104. As a result, the mixture 108 may comprise a mixture of both the granules and the fiber.

To further separate the mixture 108, a separation device 120 can be provided. In some embodiments, the separation device 120 can be provided to further separate the granules from the fiber of the mixture 108. The separation device 120 can be positioned to receive the mixture 108 and output an agglomerate (e.g., a fiber roll agglomerate) 114 and granules 116. For example, the separation device 120 can comprise one or more of an inlet (e.g., a hood or other similar structure that can receive the mixture 108 and direct the mixture to a desired location), a conveyor belt, a friction device 110, or a screen 112. In some embodiments, the mixture 108 can be separated into the agglomerate 114 (e.g., a fiber roll agglomerate) and the granules 116 by the separation device 120.

Figure 2:
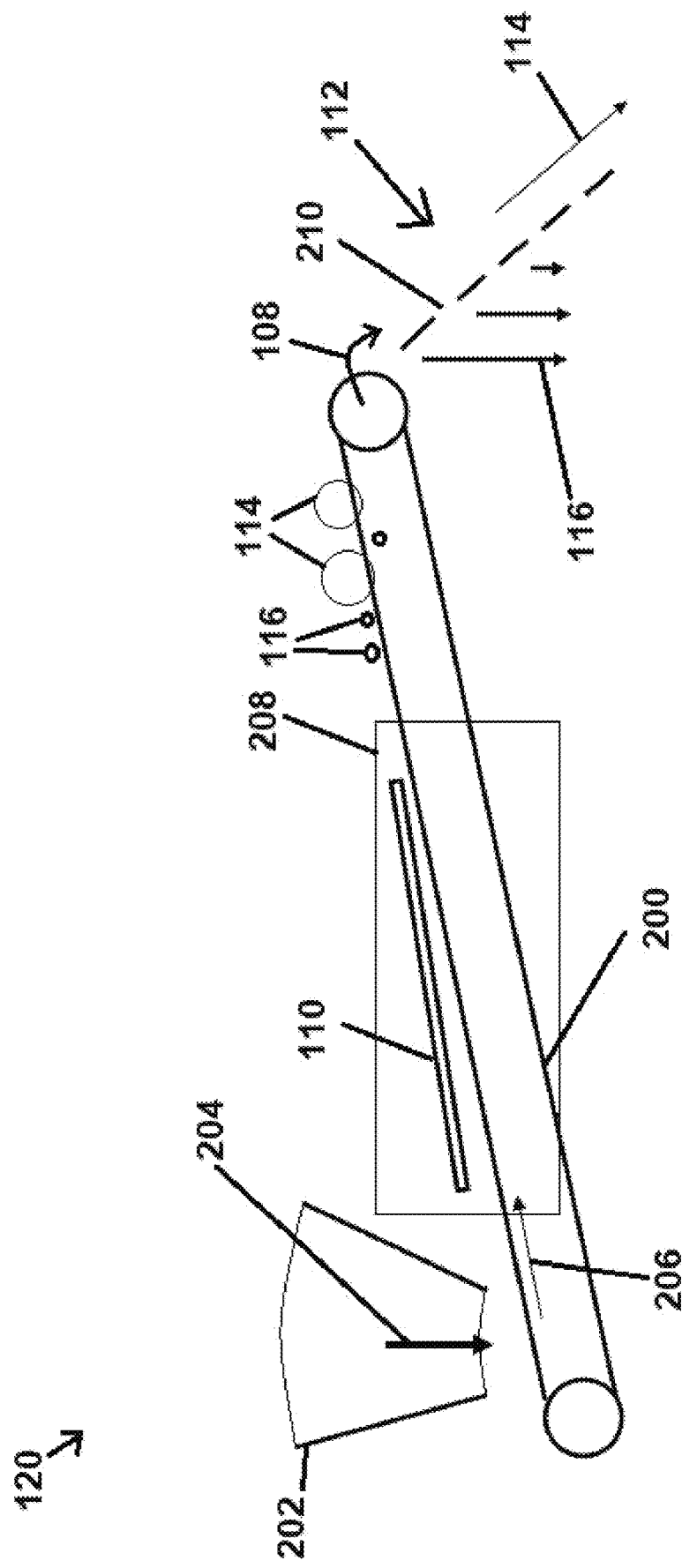
FIG. 2 schematically illustrates a separation device of the fiber separator in accordance with embodiments of the disclosure.
Figure 3:
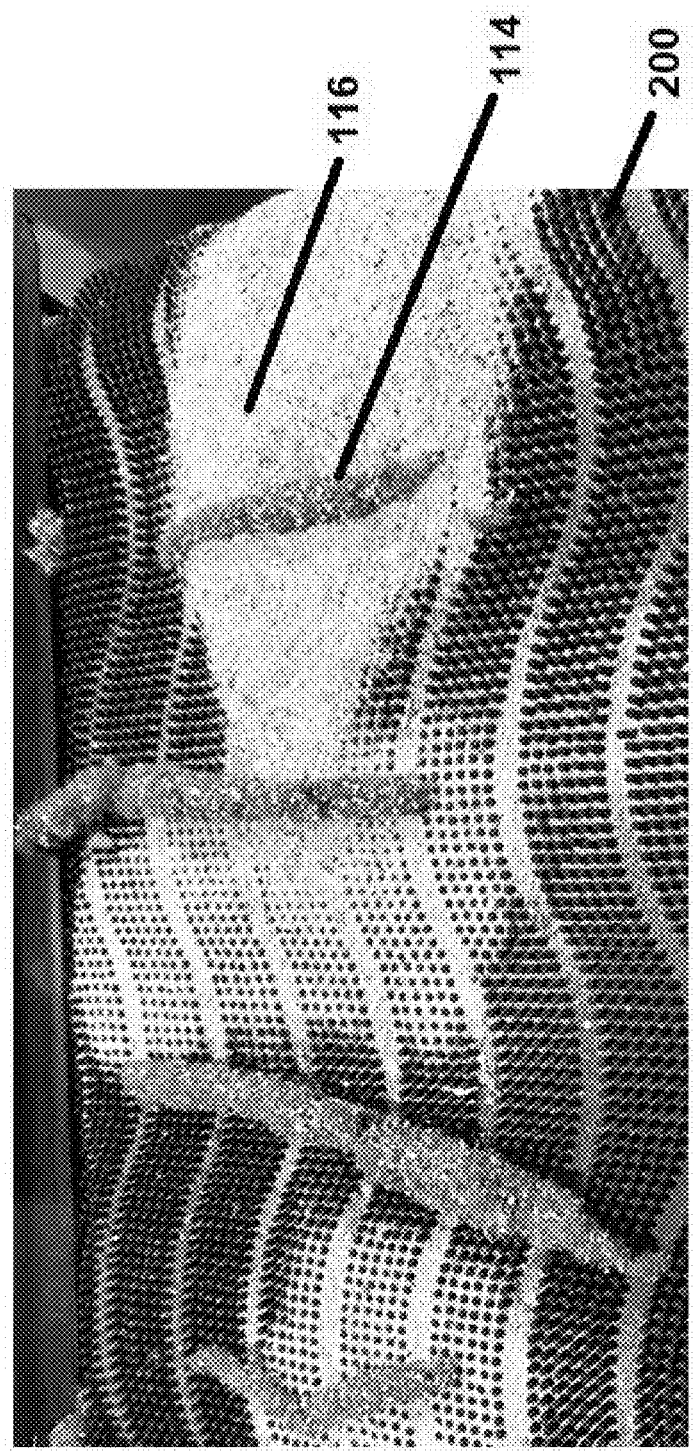
FIG. 3 illustrates an end view of some embodiments of a glass treatment apparatus in accordance with embodiments of the disclosure.

Referring to FIG. 2, an example of the separation device 120 is illustrated. The separation device 120 can be used in association with the fiber separator 100 illustrated in FIG. 1. The separation device 120 can receive the mixture 108 from the separator 104, whereupon the separation device 120 can treat the mixture 108 to obtain the desired separated sub-products.

In some embodiments, the separation device 120 can comprise an inlet 202. The inlet 202 can be positioned at an upstream end of the separation device 120, and may be located downstream from the separator 104. In some embodiments, the inlet 202 is positioned to receive the mixture 108 (e.g., the mixture of granules and fiber). The inlet 202 can receive the mixture 108 and direct the mixture 108 to a downstream location. The inlet 202 can comprise any number of structures. For example, the inlet 202 can comprise a hood or other funnel-type products. The inlet 202 may comprise one or more ducts, passageways, channels, or the like through which the mixture 108 can pass as the mixture 108 passes through the inlet 202.

The mixture 108 can move through the inlet 202 along an inlet direction 204 to a conveyor belt 200. In some embodiments, the inlet direction 204 may be vertical, such that the mixture 108 can pass through the inlet 202 and to the conveyor belt 200 by the force of gravity. However, the inlet direction 204 is not so limited, and in some embodiments, the inlet direction 204 may be at an angle other than vertical.

The conveyor belt 200 can be positioned downstream from the inlet 202, such that the conveyor belt 200 can receive the mixture 108 from the inlet 202. In some embodiments, the conveyor belt 200 can comprise one or more structures that can move the mixture 108 along the conveyor belt 200 to a desired location. For example, the conveyor belt 200 can comprise one or more of a belt, roller(s), a motor, etc. The conveyor belt 200 can be driven manually or by a motor. In general, the conveyor belt 200 can receive the mixture 108 and transport the mixture 108 in a movement direction 206 along at least some distance of the conveyor belt 200. As the mixture 108 is moved along the conveyor belt 200, the mixture 108 can be treated (e.g., a method of treating the mixture 108 of fiber and granules). In some embodiments, the conveyor belt 200 may comprise a plurality of conveyor belts, wherein the conveyor belts may be used to transport mixtures of granules and fiber from one unit operation to another. In some embodiments, these conveyor belts 200 can run at 10 to 150 feet (3 to 50 meters) per minute. The conveyor belt(s) 200 can move material from one area to another, but effect no change to the appearance of the material nor any separation of fiber from granule. In some embodiments, the conveyor belt 200 can comprise a flat conveyor belt or a curved conveyor belt.

In some embodiments, the separation device 120 comprises a friction zone 208 wherein friction and/or pressure can be applied to the mixture 108. For example, the separation device 120 comprises the friction device 110 positioned within the friction zone 208. By applying the friction device 110 to one or more portions of the conveyor belt 200, the fiber in the mixture 108 can agglomerate to form the fiber roll agglomerate 114. It will be appreciated that the agglomerate 114 and the granules 116 are illustrated schematically so as to represent that the agglomerate 114 can have a larger size than the granules 116. In operation, however, the granules 116 may be smaller, while the agglomerate 114 could be larger or smaller (but still larger than the granules 116). In some embodiments, the friction device 110 can cause the agglomerate 114 to have a cylindrical shape, and may contain thousands of fibers. In this way, the agglomerate 114 can have a size that is much larger than any individual fiber. The fibers in the agglomerate 114 can be held together by an entanglement of the fibers and by static charge. As such, no chemical binder needs to be added or is required.

In some embodiments, the friction device 110 can comprise a stationary device located above the conveyor belt 200. To form the fiber agglomerates 114, the friction device 110 (e.g., a stationary device, for example) can be positioned above the moving conveyor belt 200. In some embodiments, a gap, a space, or an opening can be provided between a bottom of the friction device 110 and the conveyor belt 200. In this way, the mixture 108 can pass through the gap between the friction device 110 and the conveyor belt 200 while contacting the friction device 110. Friction between the friction device 110 and the fiber in the mixture 108 can slow the flow of the fiber, thus causing the fiber to start to roll up. As more and more fiber enters the high friction zone, the new fiber adds to the fiber rolls therein. Eventually the fiber rolls become sufficiently large to exit the high friction zone and may be discharged. The friction device 110 (e.g., friction-inducing device or "FID") can take many shapes and can be made of many different materials. In some embodiments, the friction device 110 comprises a piece of rigid material hinged at one end (e.g., at an upstream, left end in FIG. 2) several inches above the belt, with the other end (e.g., a downstream, right end in FIG. 2) riding on the surface of the belt. In such an embodiment, the downstream, right end of the friction device 110 may be in contact with the conveyor belt 200. Alternatively, a mechanical stop can be used to suspend the downstream, right end of the friction device 110 a few millimeters above the surface of the conveyor belt 200 to minimize unintended wear and tear of the conveyor belt 200.

This friction device 110 can be made of any number of materials, such as wood, rubber, plastic or other similarly rigid materials. As the fiber in the mixture 108 approaches the location between the friction device 110 and the conveyor belt 200, the fiber's flow may be retarded by friction, and the fiber can begin to roll up into an agglomerate. Eventually, the agglomerate 114 passes under the friction device 110, lifting the downstream, downstream, right end of the friction device 110 up, and continues down the conveyor belt 200. The angle and the weight of the friction device 110 can be varied to optimize the formation of agglomerates 114.

In another embodiment, a series of friction devices 110 as described above may be placed on the conveyor belt 200. Each friction device 110 serves as a location for retarding the motion of fiber agglomerates 114, increasing the removal of fiber from the granules of the mixture 108. In this way, the separation device 120 is not limited to comprising a single friction device 110. Rather, in some embodiments, the separation device 120 may comprise a plurality of friction devices 110 that may be positioned in series along the conveyor belt 200. In some embodiments, the roughness of the friction device 110 surface closest to the conveyor belt 200 can be altered in various ways to optimize the capture and agglomeration of fiber.

The friction device 110 can also be made of a flexible material such as plastic sheeting, cloth, carpet, burlap, leather, or the like. One end of the friction device 110 is elevated 1 to 3 inches (25 to 75 mm) above the conveyor belt, and the other end is allowed the drag on the conveyor, or is suspended a few millimeters above the belt to minimize wear on the belt. Thus the flexible sheet forms half of a catenary at the leading edge, whereas the balance may lay parallel to the conveyor belt. Again, one of more of these friction devices 110 can be used in series to increase fiber agglomeration and removal.

For either flexible or rigid friction devices 110, weights can be added to the friction device 110 to increase their weight and/or to increase the friction generated between the friction device 110 and the material on the belt. For example, a weight can be placed on the friction device 110, such as on a top side of the friction device 110, to increase the weight and the friction applied by the friction device 110 to the mixture 108 and the conveyor belt 200. In this way, in some embodiments, friction may be increased which can also increase the agglomeration of the fiber.

In some embodiments, the friction device 110 may be used effectively when the mixture 108 (e.g., of feed material) is spread in a fairly even layer across the conveyor belt 200. However, if the friction pad of the friction device 110 itself is flexible, then some unevenness can be tolerated with minimal loss of efficiency. Material (e.g., the mixture 108) in a thin layer may be more thoroughly cleaned than material (e.g., the mixture 108) in a thick layer, since more of the material comes in contact with the friction device 110. Thus, in some embodiments, increasing the amount of contact between the friction device 110 and the mixture 108 may be beneficial. Material thickness on the conveyor belt 200 can be easily controlled by adjusting belt speed.

Even material distribution across the conveyor belt 200 can be achieved by the use of certain types of bulk material feeders that provide an even flow of material onto the belt, or by simply putting sides on the conveyor belt 200 and mounting a scraper blade a short distance above the belt such that the material is pulled under the scraper at a thickness no more than the distance between the top of the belt and the bottom of the scraper.

In an example, it may be beneficial if the material thickness on the belt is less than the distance between the lower surface of the friction device 110 and the conveyor belt 200 at the inlet end of the friction zone 208. Otherwise, feed material may spill over the top of the friction device 110. In some embodiments, having a rough surface on the conveyor belt 200, such as that provided by a chevron or crescent belt improves the results. Such a rough texture to the conveyor belt 200 can increase the amount of friction in the friction zone 208, improving fiber and granule separation. It appears that the fiber agglomerates tend to ride on top of the belt protrusions where as the granules sift downward and ride on the flat of the belt.

In some embodiments, having sides on the conveyor belt 200 can aid in retaining material on the conveyor belt 200. For example, higher sides can provide more containment, and minimize loss during a process upset. In some embodiments, the sides can be provided along a length of the conveyor belt 200 such that inadvertent removal of the material (e.g., the mixture 108, the agglomerate 114, the granules 116, etc.) is relatively limited.

In some embodiments, the separation device 120 can comprise the screen 112 positioned downstream from the conveyor belt 200 and the friction device 110. For example, the screen 112 can be positioned near a downstream end of the conveyor belt 200, such that the screen 112 can receive the agglomerate 114 and the granules 116 from the conveyor belt 200. In some embodiments, the screen 112 may comprise one or more openings 210 through which portions of the mixture 108 may fall. For example, the screen 112 may comprise one or more openings 210 that are large enough for some of the mixture 108 to fall through, while small enough for other portions of the mixture 108 to not fall through. In some embodiments, the granules 116 may be smaller than a size of the openings 210, such that the granules 116, when passed to the screen 112, can pass through the openings 210 in the screen 112. In some embodiments, the agglomerate 114 may be larger than a size of the openings 210, such that the agglomerate 114, when passed to the screen 112, may not pass through the openings 210 in the screen 112. Rather, in some embodiments, the agglomerate 114 can move along the screen 112 and bypass the openings 210. By passing this mixture of granules 116 and large fiber agglomerates 114 over the screen 112, the granules 116 and large fiber agglomerates 114 can be easily separated, due to the very large difference in apparent particle size. The screen 112 can function to separate the agglomerates 114 from the granules 116.

It is also possible to implement the aforementioned design on a circular rotating disk or anulus with a stationary friction inducing device.

Results:

Test 1:

Prior Attempts have Included:

The feed was a stream derived from a carpet recycling process consisting of approximately 80 vol % granules and 20 vol % fiber. The granules range in size from less than 50 microns to 3000 microns. The fibers ranged in length from less than 0.1 mm to 50 mm. Fiber diameter is less than 0.1 mm.

The feed was treated by screening on a Sweco circular screener with a screen having openings of 2.0 mm.

Most of the granules passed through the mesh.

More than 90% of the fiber in the feed passed through the mesh as well, contaminating the granules below.

A few clumps of fiber and some of the larger granules remained on top of the mesh.

Overall, there was minimal separation of fiber from granules.

Test 2:

Prior Attempts have Included:

Test 1 was repeated using a horizontal shaker screener with a screen having 1.6 mm openings. Again, more than 90% of the fiber passed through the screen and was not separated from the granules. Such screeners are ineffective at separating these types of fibers and granules.

Test 3:

Prior Attempts have Included:

The feed from Test 1 was processed through a KICE aspirator with a pressure differential of 0.5 inches of water column (about 125 Pa). Some of the larger granules (approximately 10% of the granules in the feed) accumulated in the aspirator heavy products container, along with larger clumps of fiber. The majority of the fiber (more than 75% of the fiber in the feed), however, reported to the aspirator light products container along with approximately 80% of the granules in the feed. Minimal separation of fiber and granules occurred.

The test was repeated with pressure differentials of 0.25 and 1.0 inches of water column (about 65 and 250 Pa) with similar results.

Test 4:

The same feed from Test 1 was processed using the design disclosed herein.

The conveyor belt had an embossed crescent surface to increase friction, and the friction device 110 was a piece of heavy carpet placed with the face fiber facing the conveyor belt to increase friction. The gap between the conveyor belt and the friction device 110 at the inlet to the device was about 3 inches (about 75 mm).

The feed was spread evenly across the belt in a layer about ¼ inch (about 6 mm) thick.

The device caused much of the fiber in the feed to roll up into small cylinders more than 10 mm in diameter before they passed out of the high friction zone.

After screening using a mesh with 3 mm openings, approximately 90% of the fiber in the feed was recovered as fiber agglomerates. The granules that passed through the mesh contained less than 10% of the fiber in the feed.

The device created a fiber-rich product stream and a granule-rich product stream.

Test 5:

The product from Test 4 was passed through the device again, simulating two devices in series. After screening again at 3 mm, the agglomerated fiber removal due to the two devices in series was more than 95%.

Test 6:

The process of Test 4 was repeated using a piece of wood approximately 1.5 inches thick by 12 inches long (about 40 mm thick and 300 mm long) as the friction device 110.

After a single pass, 75% of the fiber in the feed was removed from the granules as cylindrical agglomerates After a second pass, a total of 85% of the fiber in the feed was removed from the granules as cylindrical agglomerates Test 7:

This test was run using a similar feed material to Test 1, but from a different source.

The feed was a stream derived from a carpet recycling process consisting of approximately 3 wt % fiber and 97 wt % granules. The granules range in size from less than 50 microns to 3000 microns. The fibers ranged in length from less than 0.1 mm to 50 mm. Fiber diameter is less than 0.1 mm.

The feed was processed using the means of this disclosure.

The conveyor belt had a large number of short rubber fingers approximately 3/16 inch or about 5 mm high, and the friction device 110 was a piece of heavy carpet placed with the face fiber facing the conveyor belt to increase friction. Weights were placed on top of the carpet to increase friction between the friction device 110 and the conveyor belt. The gap between the conveyor belt and the friction device 110 at the inlet to the device was about 3 inches (about 75 mm).

The feed was spread evenly across the belt in a layer about ⅛ inch (about 3 mm) thick.

The device caused much of the fiber in the feed to roll up into small cylinders more than 10 mm in diameter before they passed out of the high friction zone. These fiber cylinders remained on top of the rubber fingers. The granules nestled in between the rubber fingers, and were largely fiber-free.

After re-screening the first pass product using a mesh with 3 mm openings, the residual fiber in the granules was measured.

The granular product was passed through the device a second time, and again screened at 3 mm to separate the small number of fiber cylinders created in that pass.

Analysis Showed:

| | |
|---|---|
| Feed | 3.0 wt % fiber |
| First Pass Product | 0.9 wt % fiber |
| Second Pass Product | 0.1 wt % fiber |

Test 8:

This test was run using the same feedstock as in Test 7.

The feed was a stream derived from a carpet recycling process consisting of approximately 3 wt % fiber and 97 wt % granules. The granules range in size from less than 50 microns to 3000 microns. The fibers ranged in length from less than 0.1 mm to 50 mm. Fiber diameter is less than 0.1 mm.

The feed was processed using the means of this disclosure.

The conveyor belt had a large number horizontal ribs about 0.5 mm high, and the friction device 110 was a piece of heavy carpet placed with the face fiber facing the conveyor belt to increase friction. Weights were placed on top of the carpet to increase friction between the friction device 110 and the conveyor belt. The gap between the conveyor belt and the friction device 110 at the inlet to the device was about 3 inches (about 75 mm).

The feed was spread evenly across the belt in a layer about 1 mm thick.

The device caused much of the fiber in the feed to roll up into small cylinders more than 8 mm in diameter before they passed out of the high friction zone. These fiber cylinders remained largely on top of the ribs. The granules nestled in the valley between the ribs, and were largely fiber-free.

After re-screening the first pass product using a mesh with 3 mm openings, the residual fiber in the granules was measured.

Analysis showed:

| Feed | 3.0 wt % fiber |
|---|---|
| First Pass Product | 0.2 wt % fiber |

What is claimed is:

1. A method for treating a mixture of fiber and granules comprising:
    passing the mixture through a friction zone comprising a conveyor belt that moves the mixture along a movement direction and a friction device comprising a stationary surface in contact with a surface of the mixture;
    applying pressure to the mixture with the friction device to generate friction such that at least 5% of the fiber in the mixture is rotated; and
    forming an agglomerate that is larger than the granules in the mixture; and
    moving the agglomerate and the granules along the conveyor belt through a gap between the conveyor belt and the stationary surface of the friction device to an end of the conveyor belt that is downstream from the friction device relative to the movement direction.

2. The method of claim 1, wherein the mixture comprises one or more of a recycled carpet or a tire, the stationary surface of the friction device comprising a non-aqueous material that is impermeable and extends between a first end and a second end.

3. The method of claim 1, wherein the mixture is obtained from one or more of an industrial stream containing fiber, a post-consumer stream containing fiber, a food product containing fiber, or a material containing hair.

4. The method of claim 1, wherein after forming the agglomerate, screening the agglomerate and the granules to separate the agglomerate and the granules.

5. The method of claim 4, wherein the mixture comprises one or more of a recycled carpet or a tire.

6. The method of claim 4, wherein the mixture is obtained from one or more of an industrial stream containing fiber, a post-consumer stream containing fiber, a food product containing fiber, or a material containing hair.

7. The method of claim 1, wherein, prior to passing the mixture through the friction zone, the fiber and the granules comprise a substantially similar cross-sectional size.

8. The method of claim 7, wherein, the forming the agglomerate comprises combining the fiber into the agglomerate, the agglomerate comprising a larger cross-sectional size than the fiber and the granules of the mixture that initially entered the friction zone.

9. The method of claim 1, wherein the moving the agglomerate and the granules along the conveyor belt through the gap comprises moving substantially all of the agglomerate and the granules through the gap and to the end of the conveyor belt.

* * * * *